Feb. 16, 1965    F. T. BEGLEY    3,170,130

TRANSFORMER COOLING USING THERMOELECTRIC DEVICES

Filed Jan. 24, 1962

WITNESSES

Edwin L. Bassler

Raymond C. Cheers

INVENTOR

Francis T. Begley

BY F. E. Browder

ATTORNEY

United States Patent Office 3,170,130
Patented Feb. 16, 1965

3,170,130
TRANSFORMER COOLING USING THERMO-ELECTRIC DEVICES

Francis T. Begley, Penn Hills, Pa., assignor to Westinghouse Electric Corporation, East Pittsburgh, Pa., a corporation of Pennsylvania Filed Jan. 24, 1962, Ser. No. 168,418
3 Claims. (Cl. 336—55)

This invention relates in general to cooling of transformers and more particularly to cooling of transformers by solid state devices.

Conventionally, heat dissipation is accomplished in oil cooled power transformers by forcing the hot oil at the top of the transformer through a heat exchanger and back into the bottom of the transformer tank. This method of cooling transformers requires a mechanical pump which of course requires maintenance and is subject to being consumed by normal wear and tear. Also, bulky external heat exchangers are required on the power transformers of the prior art.

Accordingly, it is the general object of this invention to provide a new and improved cooling system for power transformers.

It is a more particular object of this invention to provide a new and improved cooling system for power transformers having no moving parts and no bulky external heat exchangers.

Briefly, the above cited objects are accomplished by providing a heat pump employing solid state thermoelectric devices, operating on the principle of the Peltier effect, and an auxiliary winding magnetically coupled to the core and coil assembly of the transformer being cooled to provide electric energy to the thermoelectric devices.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
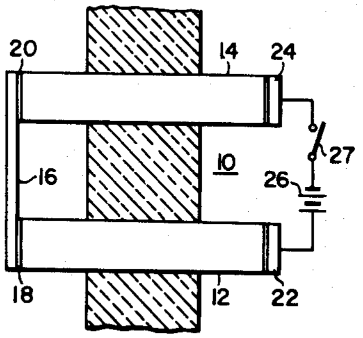
FIG. 1 is a view of a thermoelectric cooling device.

Referring to FIG. 1 of the drawing, there is illustrated a thermoelectric device 10 suitable for effecting cooling. The thermoelectric device 10 has a positive thermoelement member 12, a negative thermoelement member 14 and an electrically conducting strip of metal 16 joined to an end face 18 of the member 12 and an end face 20 of the member 14 so as to provide good electrical and thermal contact therewith. The end faces 18 and 20 may be coated with a thin layer of metal whereby good electrical contact and thermal adherence thereto is obtained. The metal strip 16 of copper, silver or the like may be brazed or soldered to the metal coated end faces 18 and 20. The metal strip 16 may be provided with suitable fins or other means for conducting heat thereto. At the other end of the member 12 is attached a metal plate or strip 22 by brazing or soldering in the same manner as was employed in attaching strip 16 to end face 18. Similarly, a metal strip or plate 24 may be connected to the other end of member 14. The plates 22 and 24 may be provided with heat dissipating fins or other cooling means whereby heat generated thereat may be dissipated. An electrical conductor attached to a source 26 of unidirectional current is affixed to the end plates 22 and 24. When a switch 27 is moved to its closed position, electrical current from the source 26 flows through the thermoelements 12 and 14 whereby cooling is effected within the metal strip 16 and heat is generated at plates 22 and 24.

It will be appreciated that a plurality of the thermoelectric devices 10 may be joined in series in order to produce a plurality of cooperating cooling thermoelements. The cold junctions of each of these joined thermoelements will be placed within a suitable chamber, for example, within a transformer tank while the hot junctions will be so disposed that they will eject heat to a suitable heat sink, for example, the atmosphere.

Figure 2:
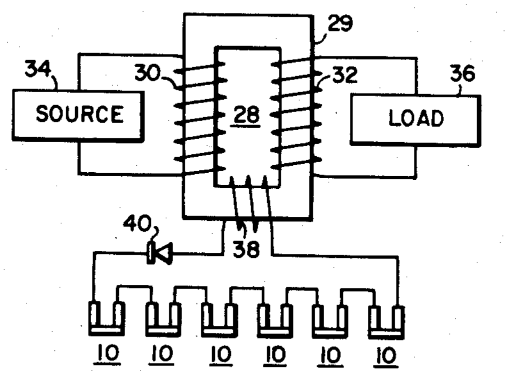
FIG. 2 is a schematic diagram of the cooling system made in accordance with my invention.

The schematic diagram of FIG. 2 shows a transformer 28 having a core member 29 and windings 30 and 32 connected to a source 34 and a load 36, respectively. An auxiliary coil 38, suitably coupled to the transformer 28, is connected, through a rectifying device 40, to a plurality of the thermoelectric devices 10 which are connected in series circuit relationship. The winding 38 in magnetic relationship with the core 29 of the power transformer 28 provides an alternating current to the rectifier 40 when the power transformer 28 is energized. The rectifier 40 connected in series circuit relationship with the plurality of thermoelectric devices 10 provides a unidirectional current required to effect cooling by the thermoelectric devices.

Figure 3:
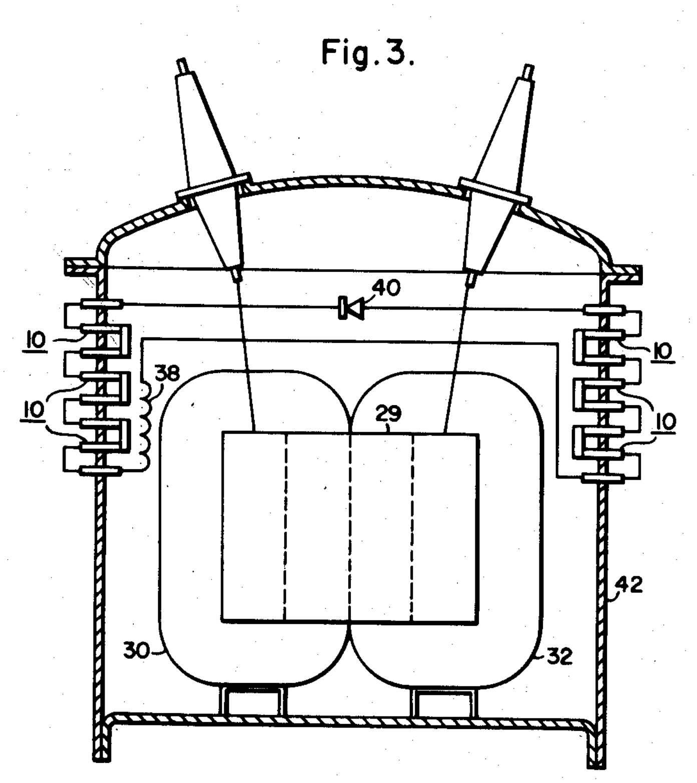
FIG. 3 is a sectional view of a power transformer and the cooling system of my invention; and, FIG. 4 is a modified embodiment of the cooling system of my invention.

The sectional view of a transformer shown in FIG. 3 shows the thermoelectric devices 10 mounted in the transformer tank wall 42 so that the cold junction is within the transformer and the hot junction is outside the transformer tank wall 42. When a transformer is energized an alternating current voltage is induced in the auxiliary winding 38. The alternating current potential of the auxiliary winding 38 is rectified by the rectifying device 40 to provide a unidirectional current to the thermoelectric element 10. When a unidirectional current flows through the thermoelectric devices 10 the end disposed inside the transformer tank 42 becomes cold thereby cooling the liquid dielectric of the transformer which of course in turn cools the transformer coils 30 and 32 and core 29 assembly. The ends of the device 10 outside the transformer tank 42 dissipate the heat to an appropriate heat sink, for example, the atmosphere.

Figure 4:
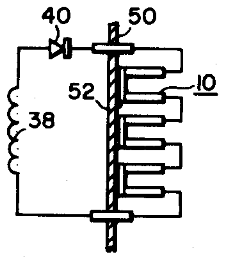

FIG. 4 is a modified embodiment of the invention whereby the thermoelectric devices are mounted on the outside wall of the transformer tank 50 with a thermal conductive and electrical insulating material 52, such as, aluminum oxide or beryllium oxide therebetween. The thermoelectric devices 10 are energized by a coil 38, in magnetic relationship with the coil and core assembly of a transformer, and a rectifier 40. In this embodiment the thermoelectric device 10 cools the transformer tank wall 50 which in turn cools the liquid dielectric and the core and coil assembly.

While there have been shown and described what are at present considered to be the preferred embodiments of the invention, modifications thereto will readily occur to those skilled in the art. It is not desired, therefore, that the invention be limited to the specific arrangements shown and described and is intended to cover in the appended claims all such modifications as fall within the true spirit and scope of the invention.

I claim as my invention:

1. An electrical transformer comprising, a tank having a liquid electrical insulating dielectric disposed therein, a plurality of electrical windings disposed in inductive relation with a magnetic core and positioned within said tank, a plurality of thermoelectric cooling devices each having a cold portion and a hot portion when an electric current flows therethrough, said plurality of thermoelectric devices being associated with said tank, with their cold portions being in heat inductive relation with said insulating dielectric and their hot portions being disposed to radiate heat to the air surrounding said tank, a rectifier disposed within said tank, and means connecting said plurality of thermoelectric devices, one of said plurality of electrical windings, and said rectifier in electric circuit relation such that electric current will flow through said thermoelectric devices when said transformer is energized with an electric potential.

2. An electrical transformer comprising, a tank having a liquid electrical insulating dielectric disposed therein, a plurality of electrical windings disposed in inductive relation with a magnetic core and positioned within said tank, a plurality of thermoelectric cooling devices each having a cold portion and a hot portion when an electric current flows therethrough, said plurality of thermoelectric devices being mounted on said tank, with their cold portions being in heat conductive relation with said tank and their hot portions being disposed to radiate heat to the air surrounding said tank, a rectifier disposed within said tank, and means connecting said plurality of thermoelectric devices, one of said plurality of electrical windings, and said rectifier in electric circuit relation such that electric current will flow through said thermoelectric devices when said transformer is energized with an electric potential.

3. An electrical transformer comprising, a tank having a liquid electrical insulating dielectric disposed therein, a plurality of electrical windings disposed in inductive relation with a magnetic core and positioned within said tank, a plurality of thermoelectric cooling devices each having a cold portion and a hot portion when an electric current passes therethrough, said plurality of thermoelectric devices extending through the wall of said tank, with their cold portions being in heat conductive relation with said insulating dielectric and their hot portions being disposed to radiate heat to the air surrounding said tank, a rectifier disposed within said tank, and means connecting said plurality of thermoelectric devices, one of said plurality of electrical windings, and said rectifier in electrical circuit relation such that electric current will flow through said thermoelectric devices when said transformer is energized with an electric potential.

References Cited in the file of this patent

UNITED STATES PATENTS

| | | |
|---|---|---|
| 2,825,033 | Rudd et al. | Feb. 25, 1958 |
| 2,984,077 | Gaskill | May 16, 1961 |
| 2,994,203 | Lackey et al. | Aug. 1, 1961 |
| 3,008,299 | Sheckler | Nov. 14, 1961 |
| 3,008,300 | Ryan et al. | Nov. 14, 1961 |